(12) United States Patent
Kim et al.

(10) Patent No.: US 11,043,182 B2
(45) Date of Patent: Jun. 22, 2021

(54) DISPLAY OF MULTIPLE LOCAL INSTANCES

(71) Applicant: Hewlett-Packard Development Company, L.P., Houston, TX (US)

(72) Inventors: Jun B. Kim, Palo Alto, CA (US); Juliano Godinho Varaschin de Moraes, Mountain View, CA (US); Binh Truong, Sunnyvale, CA (US); Carol Ozaki, Cupertino, CA (US); Brian Paul McLane, The Woodlands, TX (US); Tom Bonola, Cypress, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 217 days.

(21) Appl. No.: 15/500,259

(22) PCT Filed: Jul. 31, 2014

(86) PCT No.: PCT/US2014/049300
§ 371 (c)(1),
(2) Date: Jan. 30, 2017

(87) PCT Pub. No.: WO2016/018414
PCT Pub. Date: Feb. 4, 2016

(65) Prior Publication Data
US 2017/0213520 A1    Jul. 27, 2017

(51) Int. Cl.
*G06F 9/48*  (2006.01)
*G09G 5/00*  (2006.01)
(Continued)

(52) U.S. Cl.
CPC ......... *G09G 5/003* (2013.01); *G06F 3/04845* (2013.01); *G06F 3/04883* (2013.01);
(Continued)

(58) Field of Classification Search
CPC ............... G09G 5/003; G09G 2370/06; G09G 2340/0492; G09G 2370/10;
(Continued)

(56) References Cited

U.S. PATENT DOCUMENTS 7,545,386 B2   6/2009   Marsyla et al.
7,844,900 B2   11/2010  Catanese et al.
(Continued)

FOREIGN PATENT DOCUMENTS

CN   102356387   2/2012
CN   102918490   2/2013
(Continued)

OTHER PUBLICATIONS

Mann, C.; "Software for mirroring a display across multiple Android devices"; Sep. 10, 2013; 4 pages.

*Primary Examiner* — Jennifer N To
*Assistant Examiner* — Kuang F Chen
(74) *Attorney, Agent, or Firm* — Fabian Van Cott (57) ABSTRACT

An example processor-implemented method for adjusting screen orientation of a display associated with a device with the present disclosure includes establishing connection between the display unit and a plurality of devices. The plurality of instances run on the plurality of devices. The method also includes displaying simultaneously on the display screen of the display unit the plurality of instances.

17 Claims, 4 Drawing Sheets

(51) Int. Cl.
*G06F 3/14* (2006.01)
*G06F 3/0484* (2013.01)
*G06F 3/0488* (2013.01)

(52) U.S. Cl.
CPC .............. *G06F 3/14* (2013.01); *G06F 3/1454* (2013.01); *G09G 2340/0492* (2013.01); *G09G 2370/06* (2013.01); *G09G 2370/10* (2013.01); *G09G 2370/16* (2013.01); *G09G 2370/22* (2013.01)

(58) Field of Classification Search
CPC .. G09G 2370/16; G09G 2370/22; G06F 3/14; G06F 3/1454; G06F 3/04845; G06F 3/04883
See application file for complete search history.

(56) References Cited

U.S. PATENT DOCUMENTS

| | | | | |
|---|---|---|---|---|
| 8,464,184 | B1* | 6/2013 | Cook | G06F 1/1694 709/213 |
| 8,594,467 | B2* | 11/2013 | Lu | G06F 3/017 382/302 |
| 2004/0010622 | A1* | 1/2004 | O'Neill | G06T 9/001 709/247 |
| 2005/0108709 | A1* | 5/2005 | Sciandra | G06F 9/505 718/1 |
| 2009/0030971 | A1 | 1/2009 | Trivedi | |
| 2009/0328033 | A1* | 12/2009 | Kohavi | G06F 9/5027 718/1 |
| 2011/0055372 | A1* | 3/2011 | Elyashev | G06F 9/45537 709/224 |
| 2011/0199389 | A1 | 8/2011 | Lu et al. | |
| 2012/0081383 | A1 | 4/2012 | Reeves et al. | |
| 2012/0089992 | A1* | 4/2012 | Reeves | G06F 3/1431 719/318 |
| 2012/0216126 | A1 | 8/2012 | Trivedi et al. | |
| 2012/0290943 | A1 | 11/2012 | Toney et al. | |
| 2013/0059578 | A1* | 3/2013 | Finberg | H04L 12/6418 455/425 |
| 2013/0097516 | A1 | 4/2013 | Hong et al. | |
| 2013/0194238 | A1* | 8/2013 | Sakai | H04N 21/4314 345/175 |
| 2013/0219295 | A1* | 8/2013 | Feldman | G06F 3/0481 715/751 |
| 2014/0032635 | A1 | 1/2014 | Pimmel et al. | |
| 2014/0040781 | A1 | 2/2014 | Epstein | |
| 2014/0359481 | A1* | 12/2014 | Dawson | G06Q 10/10 715/753 |
| 2015/0169880 | A1* | 6/2015 | Kim | G06F 21/6281 726/26 |
| 2015/0215570 | A1* | 7/2015 | Leibow | G06F 3/14 386/231 |

FOREIGN PATENT DOCUMENTS

| | | |
|---|---|---|
| CN | 103283254 | 9/2013 |
| CN | 103631836 | 3/2014 |
| JP | 3661610 | 6/2005 |
| JP | 2013179553 A | 9/2013 |

* cited by examiner

DISPLAY OF MULTIPLE LOCAL INSTANCES

CROSS-REFERENCE TO RELATED APPLICATION

This application is a U.S. National Stage Application of and claims priority to International Patent Application No. PCT/US2014/049300, filed on Jul. 31, 2014, and entitled "DISPLAY OF MULTIPLE INSTANCES," which is hereby incorporated by reference in its entirety.

BACKGROUND

With the recent development, the number of devices used by one or more people in one space has increased significantly. Moreover, the number of applications that can be used on these devices are increasing significantly as well. For example, in a single household, there may be multiple advanced mobile or handheld computing devices (e.g., smartphones, tablets, etc.) in addition to computers, laptops, cameras and many other devices, running many different applications on different operating systems.

With the advent of computers and computer systems, users have been afforded useful technologies for managing documents of various types, data of various types, calendar information, contacts information, and the like. Users are able to create and share useful presentations, charts, images, and the like.

These computing platforms may have different operating systems. For example, a mobile computing platform may include a mobile operating system ("OS") running on a mobile processor. For example, some smartphones run GOOGLE'S® ANDROID® operating system. GOOGLE R and ANDROID® are registered trademarks of Google, LLC. ANDROID® runs applications that are specifically developed to run on the ANDROID® operating system. Further, these devices are equipped with a diverse set of communication interfaces for the applications.

BRIEF DESCRIPTION OF THE DRAWINGS

Examples are described in the following detailed description and in reference to the drawings, in which.

DETAILED DESCRIPTION

Various aspects of the present disclosure are directed to a single display system for multiple devices. More specifically, and as described in greater detail below, various aspects of the present disclosure are directed to a manner by which multiple devices operating in same or different operating systems may be displayed on one screen while allowing remote interaction with devices.

Aspects of the present disclosure described herein disclose allowing the user to display content from a plurality of devices. Among other things, this approach allows remote interaction with multiple devices through one screen. The user can use touch gestures to control all the devices on the same display. Moreover, aspects of the present disclosure described herein allow multiple instances of operating systems to be displayed at the same time in a consolidated view where each instance can interact with each other. Among other things, this approach may provide the flexibility of using a single screen which is not restricted to displaying only the devices or applications that are compatible with each other.

In one example in accordance with the present disclosure, a method for managing a plurality of instances is provided. The method comprises establishing connection between the display unit and a plurality of devices, wherein the plurality of instances run on the plurality of devices; and displaying simultaneously on the display screen of the display unit the plurality of instances.

In another example in accordance with the present disclosure, a system is provided. The system comprises an operation engine to manage a display unit, a network engine to establish connection between the display unit and a plurality of devices running a plurality of instances, a window engine to create windows on the display unit to display the plurality of instances, a remote operation engine to allow remote operation of the plurality of instances displayed on the display unit, and an interaction engine to manage interactions between the plurality of instances displayed on the display unit.

In a further example in accordance with the present disclosure, a non-transitory computer readable medium is provided. The non-transitory computer-readable medium comprises instructions which, when executed, cause a device to (i) establish connection between the display unit and a plurality of devices, wherein the plurality of instances run on the plurality of devices; and (ii) display simultaneously on the display screen of the display unit the plurality of instances.

Figure 1:
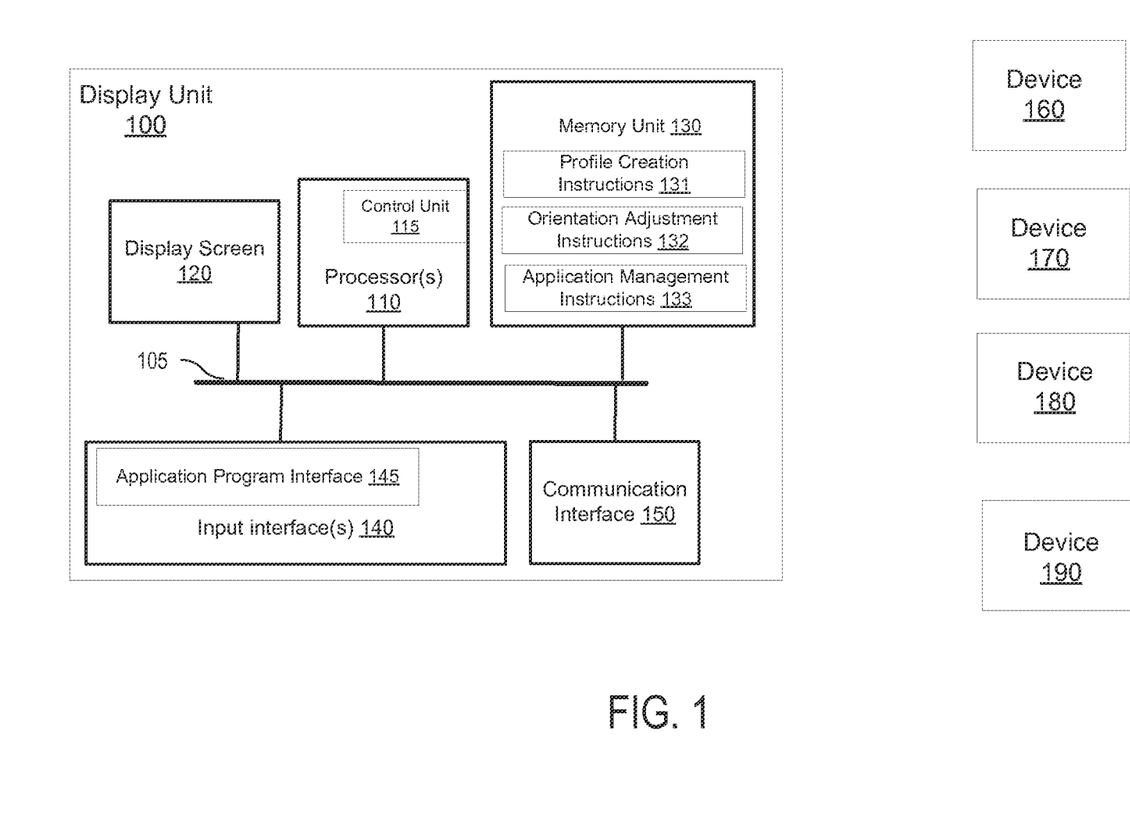
FIG. 1 illustrates a schematic representation of an example display unit in accordance with an implementation of the present disclosure.

FIG. 1 is a schematic representation of an example display unit 100 connected to a plurality of devices 160-190. It should be readily apparent that the present illustration should not be interpreted to be limited by this particular illustrative architecture shown in FIG. 1, and the display unit 100 represents a generalized illustration and that other elements may be added or the illustrated elements may be removed, modified, or rearranged in many ways.

The display unit 100 includes, but may not be limited to, a processor 110 (e.g., a central processing unit, a microprocessor, a microcontroller, or another suitable programmable device), a display screen 120, a memory unit 130, input interfaces 140, and a communication interface 150. Each of these components or any additional components of the display unit 100 is operatively coupled to a bus 105. The bus 105 may be any of several types of bus structures including a memory bus or memory controller, a peripheral bus, and a local bus using any of a variety of bus architectures. In other examples, the display unit 100 includes additional, fewer, or different components for carrying out similar functionality described herein.

The processor 110 includes a control unit 115 and may be implemented using any suitable type of processing system where at least one processor executes computer-readable instructions stored in the memory 130. The processor 110 may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage medium (e.g., the memory 130), or a combination thereof. In one implementation, additional CPUs may be plugged into the display unit 120 to scale the unit to support more instances. For example, the processor 110 may support one local instance and up to 3 remote instances. 3 additional modules may be connected to the display unit 120, which would allow providing support for 3 local instances and up to 9 remote instances.

The machine readable medium 130 may be a non-transitory computer-readable medium that stores machine readable instructions, codes, data, and/or other information. The instructions, when executed by processor 110 (e.g., via one processing element or multiple processing elements of the processor) can cause processor 110 to perform processes described herein.

Further, the computer readable medium 130 may participate in providing instructions to the processor 110 for execution. The machine readable medium 130 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. As discussed in more detail above, the processor 110 may be in data communication with the machine readable medium 130, which may include a combination of temporary and/or permanent storage. The machine readable medium 130 may include program memory that includes all programs and software such as an operating system, user detection software component, and any other application software programs. The machine readable medium 130 may also include data memory that may include multicast group information, various table settings, and any other data required by any element of the ASIC.

The processor 110 includes a control unit 115 and may be implemented using any suitable type of processing system where at least one processor executes computer-readable instructions stored in the memory 130.

The communication interface 150 enables the display unit 100 to communicate with a plurality of networks and communication links. In some examples, the communication interface of the display unit 100 may include a Wi-Fi® interface, a Bluetooth interface, a 3G interface, a 4G interface, a near filed communication (NFC) interface, and/or any other suitable interface that allows the computing device to communicate via one or more networks. The networks may include any suitable type or configuration of network to allow the display unit 100 to communicate with any external systems or devices (e.g., the devices 160-190).

The input interfaces 140 can process information from the various external system, devices (e.g., the devices 160-190), and networks that are in communication with the display unit 100. For example, the input interfaces 140 include an application program interface 145. In other examples, the input interfaces 140 can include additional interfaces. More specifically, the application program interface 145 receives content or data (e.g., video, images, data packets, graphics, etc.) from the devices 160-190.

The display screen 120 may be a transparent liquid crystal display (LCD), an organic light emitting diode (OLED) display, a plasma display, or any other suitable display. The display screen 120 is to display content from one or more applications communicated to the display unit 100 on a window shown on the display screen 120. In one implementation, the display screen 120 comprises various display properties such as resolution, display pixel density, display orientation and/or display aspect ratio. The display screen 120 may be of different sizes and may support various types of display resolution, where display resolution is the number of distinct pixels in each dimension that can be displayed on the display screen 120. For example, the display screen 120 may support high display resolutions of 1920×1080, or any other suitable display resolutions. When the display screen supports a 1920×1080 display resolution, 1920 is the total number of pixels across the height of the display 120 and 1080 is the total number of pixels across the height of the display 120.

As discussed above, the display unit 100 may be connected to the devices 160-190 via HDMI, Wi-Fi, Bluetooth, over the local network or over the internet cloud. The devices 160-190 may be computing device, which includes one of various computing devices that have a keyboard/battery portion and a display screen portion. The computing devices may include, but not limited to, any one of various desktops, laptops, tablets, smart phones, watches and other similar devices. These devices may operate as a stationary computing device (e.g., personal computers (i.e., desktops), server computers, laptop computers (with permanently attached display screens), all in one devices, and other similar devices that possess comparable characteristics). In other implementations, these devices can be handheld devices, such as tablets and smart phones.

In one implementation, at least one of the devices 160-190 may run mobile applications, which include one of various software applications that are developed and designed to run on mobile devices, convertible, computers and other computing devices. Mobile applications frequently serve provide users with similar services to those accessed on personal computers and are usually available through application distribution platforms. For example, the mobile applications may include a social media platform such as Twitter, YouTube, Brightcove, Facebook, and Tumblr, as well as instant messaging. The social media platform may encompass services or forums which support electronic social interaction between users, and also provide for sharing of electronic content. For example, electronic content may be in the form of a video posted to a social media service and subsequently viewed and commented on by one or more users of that social media service.

In one implementation, a device may run instances of an operating system running using the power of the device. For example, the device 160 may be a desktop computer, which includes a processor, memory and storage. The device 160 may run an instance of a WORD® Document program on WINDOWS® operating system utilizing the resources (e.g., processor, memory) of the desktop. WORD® is a registered trademark of Microsoft®. WINDOWS® is a registered trademark of MICROSOFT. Such an instance may be called a remote instance. Remote instances require the ability to connect with the display unit 100 in order to initiate the interaction between the device that the remote instance is being communicated from to the display unit 100. For example, the instance may be running on the device 160. A connection may be established with the device 160 and the display unit 100 in order to display the instance from the device 160 on the display unit 100.

In order to achieve this connection between the device and the display unit 100, the display unit 100 may be paired with the device 160. In one implementation, the device 160 may be paired with the display unit 100. Such pairing is performed one time, which installs an application and authorizes the device 160. From that point forward, the installed application provides the connection in addition to synchronization of data between the device 160 and the display unit 100.

In order to achieve the pairing of the device 160 with the display unit 100, the device 160 and the display unit 100 may be connected via any connectivity mechanism (e.g., Wi-Fi, network, Bluetooth) or using near-field-communication (NFC). For example, a receiver may be implemented on the display unit 100, and when the device 160 is moved within the NFC range, the display unit 100 may automatically detect the device 160 and pair with the device 160 initiating the display of the instance from the device 160 on the display screen 120. In another implementation, the display unit 100 may have a Bluetooth low energy beacon, which can be used to automatically recognize the devices (e.g., the device 160) within the Bluetooth zone. At that point, the display unit 100 may send a message to the device 160 to pair with it automatically. In a further implementation, the display unit 100 may have a QR code, and the device 160 may be used to capture an image of the QR code to initiate the pairing. In another implementation, a public or private webserver (e.g., URL to the internet) related to the display unit 100 can be used to register the device 160, which will initiate a TCP or socket connection.

In another implementation, the device 160 may start to stream the instances of the device 160 on the display unit 100 after the device 160 is paired with the display unit 100. This may be called mirroring. Further, the mirrored remote instances displayed on the display unit 100 may be operated remotely. More specifically, if the user of the device 160 chooses to launch a new application on the device 160, the user may interact directly with the display unit by providing input, such as touching the display screen 120 and operating the remote instance of the device 160. This interaction leads to the option to use the display unit as a collaboration platform between a plurality of users.

In another implementation, a device may run instances of an operating system using the power of the display unit 100. For example, the device 170 may be a tablet and may run an instance on ANDROID® operating system, utilizing the resources (e.g., processor, memory) of the display unit 100 instead of the resources of the tablet. Such instances can be called local instances. Moreover, the device 180 may be a watch, which does not have a processor or storage. The device 180 may run utilizing the resources of the display unit 100. A virtual representation of the watch may be displayed on the display screen 120 of the display unit 100, and this instance of the watch, which is considered a local instance, shown may be powered by the resources of the display unit 100.

Figure 2A:
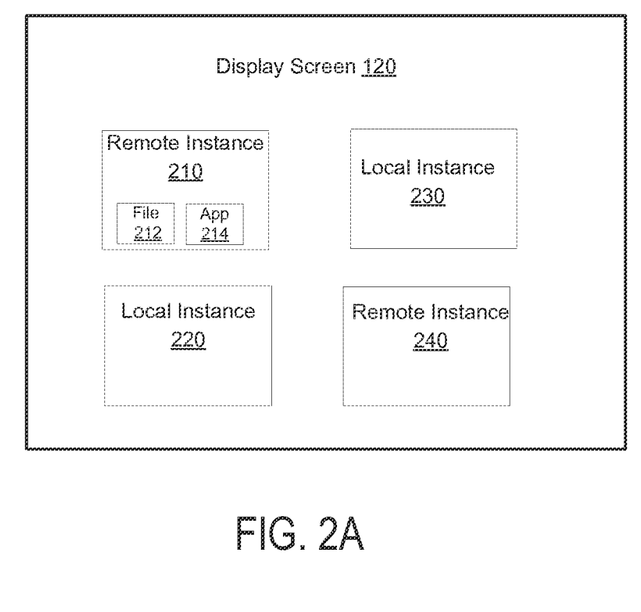
FIGS. 2A and 2B illustrate example interfaces of the display screen of the display unit in accordance with an implementation.
Figure 2B:
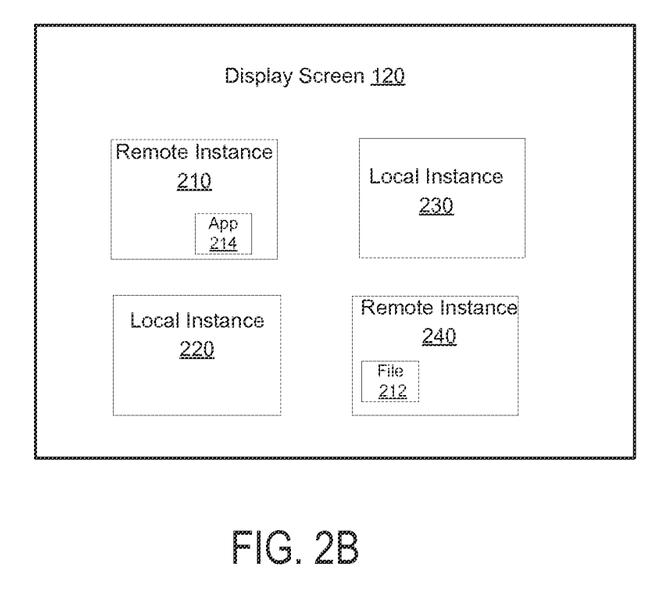

FIGS. 2A and 2B illustrate examples of the display screen 120 of the display unit 100 of FIG. 1. As illustrated in FIG. 2A, a plurality of the local and remote instances are displayed on the display screen 120 of the display unit 100, and these instances may be communicated from a plurality of devices (e.g., the devices 160-190) at the same time. For example, the device 170 may stream one local instance 220 and one remote instance 210 to the display unit 100. At the same time, the device 180 may stream one local 230 and one remote instance 240 to the display unit 100. Plus, the instances from the device 170 may be running ANDROID®, and the instances from the device 180 may be running WINDOWS® PC operating system. All of these instances may be displayed on the display unit 100 at the same time.

It should be readily apparent that the present illustration should not be interpreted to be limited by this particular illustrative architecture shown in FIGS. 2A and 2B, and the display screen 120 represents a generalized illustration and that other elements may be added or the illustrated elements may be removed, modified, or rearranged in many ways. For example, two remote instances and two local instances are shown as examples, and more or less number of remote or local instances may be shown in another implementation.

In one implementation, the projected instances 210-240 of a plurality of operating systems from a plurality of devices may be able to interact with each other through commands executed on the display unit 100. This is enabled by software installed in the operating system of each instance. More specifically, in one implementation, a user may drag a file 212 from the remote instance 210 of the device 170 to the remote instance 240 of the device 180. The transfer of the file 212 is initiated when the user drags the file 212 outside of the window of the remote instance 210. The file 212 is uploaded to a common location. In one example, the common location may be a local storage. In another example, the common location may be the cloud. A message is sent to the devices 170 and 180, which are the participants of the transfer when the transfer is completed. At that point, the device 180, which is the destination/target device, may start downloading the file 212 from the common location. FIG. 2B illustrates the display screen 120 showing the file 212 moved from the remote instance 210 to the remote instance 240.

Figure 3:
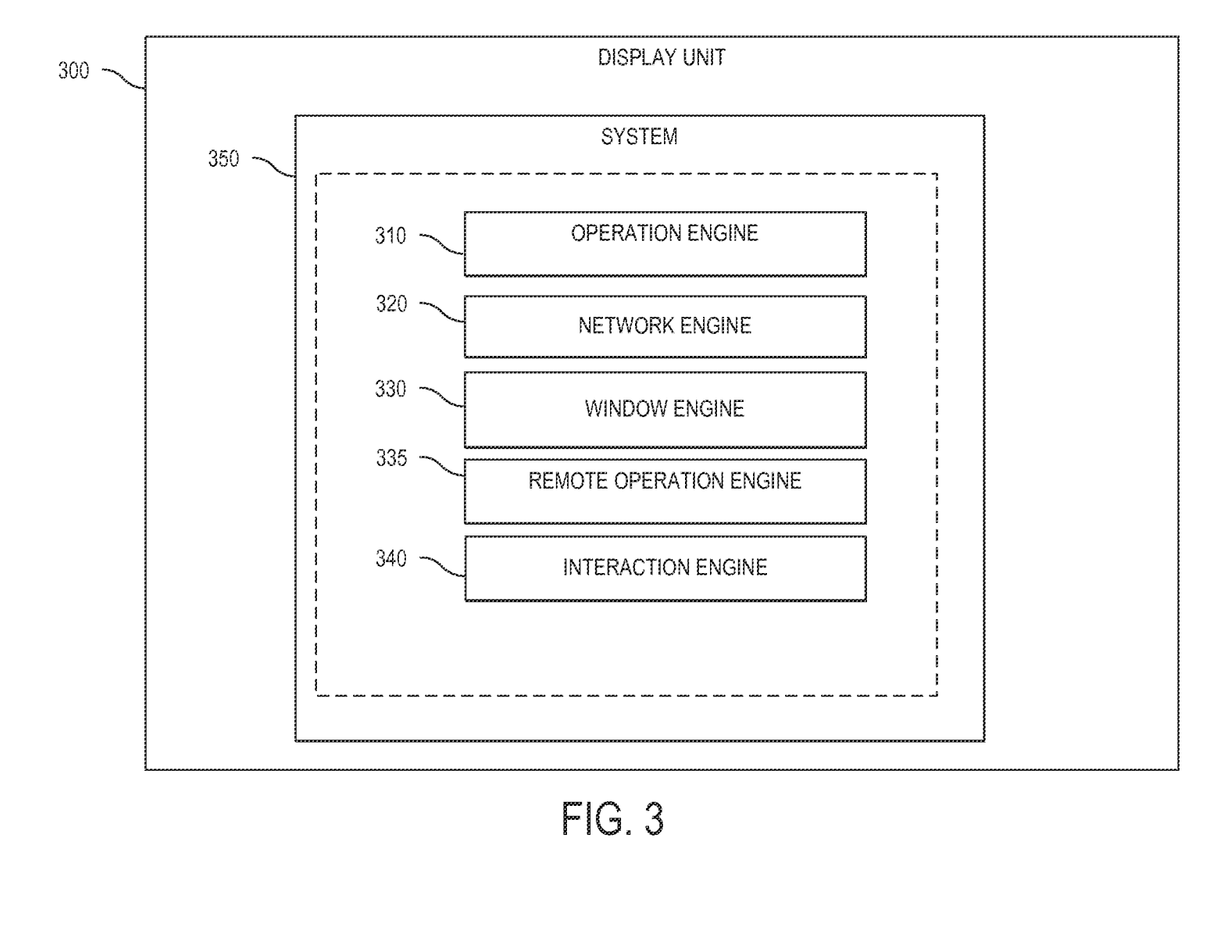
FIG. 3 illustrates an example system for displaying multiple instances in accordance with an implementation.

FIG. 3 illustrates an example of a display unit 300 to manage multiple instances from multiple devices via the system 350. The system 350 illustrated in FIG. 3 includes various engines to implement the functionalities described herein. The system 300 may include at least an operation engine 310, a network engine 320, window engine 330, a remote operation engine 335, and an interaction engine 340. Although the various engines 310-340 are shown as separate engines in FIG. 3, in other implementations, the functionality of all or a subset of the engines 310-340 may be implemented as a single engine.

Each of the engines of system 350 may be any suitable combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement system 350. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry.

The operation engine 310 handles an operating system, such as iOS®, WINDOWS®, ANDROID®, and any other suitable operating system. iOS® is a registered trademark of Apple Inc. The operating system can be multi-user, multi-processing, multitasking, multithreading, and real-time. In one implementation, the operating system is stored in a memory (e.g., the memory 130 as shown in FIG. 1) performs various tasks related to the use and operation of the display unit 300. Such task may include installation and coordination of the various hardware components of the display unit 300, operations relating to instances from various devices in the display, recognizing input from users, such as touch on the display screen, keeping track of files and directories on memory (e.g., the memory 130 as shown in FIG. 1); and managing traffic on bus (e.g., as shown in FIG. 1).

The network engine 320 includes various components for establishing and maintaining device connections, such as computer-readable instructions for implementing communication protocols including TCP/IP, HTTP, Ethernet®, USB®, and FireWire®. The network engine 320 supports the pairing process between the display unit 300 and various devices providing instances to be displayed on the display unit 300.

Further, the system may include various components, such as a window engine 330. In one example, the window engine 330 may be a subset of the operation engine 310 that assists with the creation and management of windows displayed on the display (e.g., the display screen 120 as shown in FIG. 1) when a new instance is communicated to the display unit 300 from a device.

The remote operation engine 335 may manage the operation of the instances that are displayed on the display unit 300. For example, the remote operation engine 335 receives a command from the user to perform an action on one of the instances being displayed on the display unit 300. The user communicates the command by touching the instance window on the display screen of the display unit 300. For example, the display unit 300 may display a remote instance of a mobile operating system from a mobile device. The user may touch an image of an application shown on the instance window on the display screen to launch that application on that mobile device. The remote operation engine 335 communicates the command received from the user to the mobile device, and the mobile device may launch the requested application. An updated instance may be provided to the display unit 300, and the display unit 300 may display on the display screen an instance of the application, available for the user to operate.

The interaction engine 340 may manage the interaction between a plurality of instances displayed on the display screen of the display unit 300. For example, when a user moves a file from one instance to another, the interaction engine 340 may work with the devices to initiate the transfer process.

Figure 4:
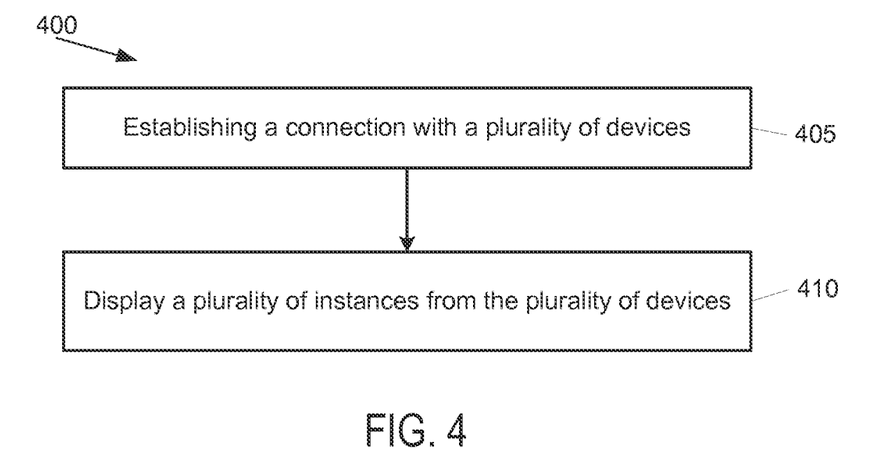
FIGS. 4 and 5 illustrate example process flow diagrams in accordance with an implementation.

Turning now to the operation of the system 100, FIG. 4 depicts a process flow diagram 400 in accordance with an example implementation. It should be readily apparent that the processes depicted in FIG. 4 represent generalized illustrations, and that other processes may be added or the illustrated processes may be removed, modified, or rearranged in many ways. Further, it should be understood that the processes may represent executable instructions stored on memory that may cause a processing device to respond, to perform actions, to change states, and/or to make decisions, for instance. Thus, the described processes may be implemented as executable instructions and/or operations provided by a memory associated with the computing device 400.

The illustrated process 400 begins at block 405, where a connection is established between the display unit and multiple devices. Multiple instances of different operating systems run on these devices. At block 410, the instances are displayed simultaneously on the display screen of the display unit.

Figure 5:
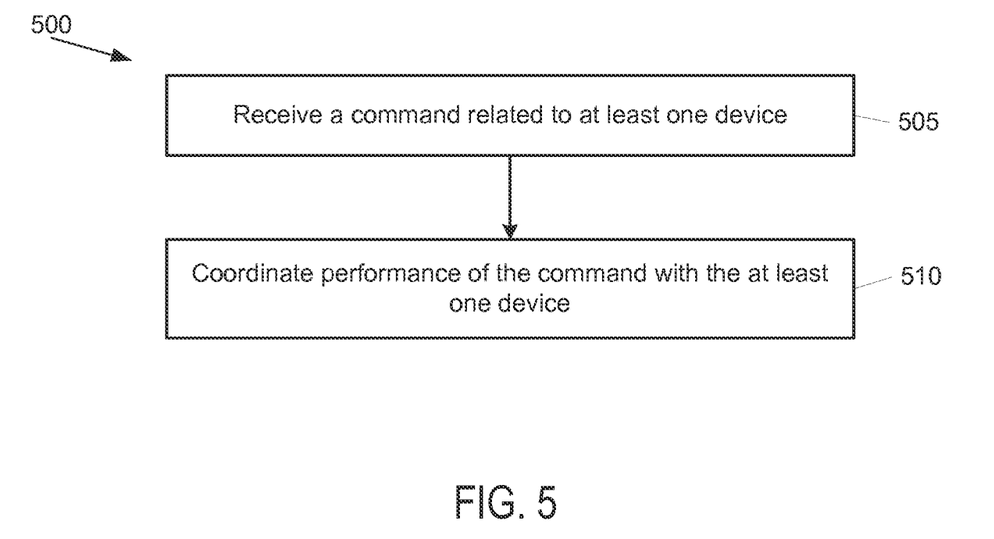

Turning now to the operation of the system 100, FIG. 5 depicts a process flow diagram 500 in accordance with an example implementation. It should be readily apparent that the processes depicted in FIG. 5 represent generalized illustrations, and that other processes may be added or the illustrated processes may be removed, modified, or rearranged in many ways. Further, it should be understood that the processes may represent executable instructions stored on memory that may cause a processing device to respond, to perform actions, to change states, and/or to make decisions, for instance. Thus, the described processes may be implemented as executable instructions and/or operations provided by a memory associated with the computing device 500.

The illustrated process 500 begins at block 505, where a command is received from a user. The command is associated with one of the multiple instances running on one of the devices connected to a display unit (e.g., the display unit 100 as shown in FIG. 1). At block 510, the command is delivered to the device, and the device performs the command.

While the above disclosure has been shown and described with reference to the foregoing examples, it should be understood that other forms, details, and implementations may be made without departing from the spirit and scope of the disclosure that is defined in the following claims.

What is claimed is:

1. A processor-implemented method for managing a plurality of instances on a display screen of a display unit, comprising:
    establishing connection between the display unit and a plurality of devices, wherein the plurality of instances run on the plurality of devices; and
    responsive to a first device of the plurality of devices entering a communication range of the display unit, simultaneously displaying on the display screen of the display unit the plurality of instances;
    wherein:
        establishing the connection between the display unit and the plurality of devices includes receiving, from the first device of the plurality of devices, an indication that the first device has scanned a quick response (QR) code associated with the display unit;
        scanning of the QR code by the first device automatically causes the first device to initiate a pairing process with the display unit; and
        the plurality of instances comprise, from a first device of the plurality of devices, both:
            a remote instance that runs on processing and memory resources from the first device, through which a command executed on the display unit is executed on the first device; and
            a local instance that runs on processing and memory resources of the display unit instead of the first device to execute an operating system for the first device.

2. The method of claim 1, wherein the plurality of instances correspond to a plurality of operating systems.

3. The method of claim 1, further comprising allowing remote operation of the plurality of instances displayed on the display screen.

4. The method of claim 3, wherein allowing the remote operation of the plurality of instances displayed on the display screen comprises:

receiving, from a user, a command associated with one of the plurality of the instances running on a device; and delivering the command to the device, wherein the device performs the command.

5. The method of claim 4, wherein receiving the command comprises receiving a touch gesture from the user on the display screen, the touch gesture targeting specific areas of the display screen, where the one of the plurality of instances is displayed.

6. The method of claim 1, further comprising managing interactions between the plurality of instances displayed on the display screen.

7. The method of claim 6, wherein managing the interactions between the plurality of instances displayed on the display screen comprises:

receiving a command related to at least one of the plurality of instances; and coordinating performance of the command with devices associated with the at least one of the plurality of instances.

8. The method of claim 7, wherein the command represents moving a file from a first device to a second device, wherein receiving the command related to the at least one of the plurality of instances comprises receiving a touch gesture of dragging a file from the first device to the second device, and wherein coordinating the performance of the command comprises initiating the transfer of the file from the first device to the second device.

9. The method of claim 6, wherein managing the interactions between the plurality of instances displayed on the display screen comprises:

transferring a file from a first device to a local storage of the display unit;

notifying a user of the first device and a user of a second device when a transfer to the local storage is complete; and responsive to a completion of the transfer, downloading the file from the local storage to the second device.

10. The method of claim 1, wherein the connection is established between the display unit and a device responsive to the device entering a communication range of the display unit.

11. The method of claim 1, further comprising, upon pairing, installing an application on the display unit.

12. A system, comprising:

an operation engine to manage a display unit, wherein responsive to a first device of a plurality of devices entering a communication range of the display unit, a display screen of the display unit is to simultaneously display the plurality of instances;

a network engine to establish connection between the display unit and a plurality of devices, wherein:

a plurality of instances run on the plurality of devices;

establishing the connection between the display unit and the plurality of devices includes receiving, from the first device of the plurality of devices, an indication that the first device has scanned a quick response (QR) code associated with the display unit; and scanning of the QR code by the first device automatically causes the first device to initiate a pairing process with the display unit;

a window engine to create windows on the display unit to display the plurality of instances;

a remote operation engine to avow remote operation of the plurality of instances displayed on the display unit; and an interaction engine to:

manage interactions between the plurality of instances displayed on the display unit; and facilitate interactions between the plurality of instances by installed program code on an operating system of each instance;

wherein the plurality of instances include, from a first device of the plurality of devices both:

a remote instance that runs on processing and memory resources from the first device, through a command executed on the display unit is executed on the first device; and a local instance that runs on processing and memory resources of the display unit instead of the first device to execute an operating system for the first device.

13. The system of claim 12, wherein the display unit comprises a modular architecture to support for the plurality of instances.

14. The system of claim 13, wherein the modular architecture comprises four processing modules.

15. The system of claim 12, wherein running on processing and memory resources from the first device comprises:

receiving, at the display unit, a command associated with the remote instance;

delivering the command to the first device; and performing, at the first device, the command.

16. A non-transitory computer-readable medium comprising instructions which, when executed, cause a display unit to:

establish connection between the display unit and a plurality of devices, wherein a plurality of instances run on the plurality of devices; and responsive to a first device of the plurality of devices entering a communication range of the display unit, display simultaneously on a display screen of the display unit the plurality of instances;

wherein:

establishing the connection between the display unit and the plurality of devices includes receiving, from the first device of the plurality of devices, an indication that the first device has scanned a quick response (QR) code associated with the display unit;

scanning of the QR code by the first device automatically causes the first device to initiate a pairing process with the display unit; and the plurality of instances comprise, from a first device of the plurality of devices, both:

a remote instance that runs on processing and memory resources from the first device, through which a command executed on the display unit is executed on the first device; and a local instance that runs on processing and memory resources of the display unit instead of the first device to execute an operating system for the first device.

17. The non-transitory computer-readable medium of claim 16, further comprising instructions which cause the display unit to provide a collaboration environment accepting inputs from the plurality of devices, wherein the plurality of devices run a plurality of operating systems.

* * * * *